United States Patent
Roush et al.

(10) Patent No.: US 8,657,363 B1
(45) Date of Patent: Feb. 25, 2014

(54) CONNECTOR BETWEEN NON-METALLIC SCUFF AND LINING

(75) Inventors: Mark Roush, Lafayette, IN (US); Ren Yong Xu, Qingdao (CN)

(73) Assignee: Vanguard National Trailer Corporation, Monon, IN (US)

( * ) Notice: Subject to any disclaimer, the term of this patent is extended or adjusted under 35 U.S.C. 154(b) by 0 days.

(21) Appl. No.: 13/598,881

(22) Filed: Aug. 30, 2012

(51) Int. Cl.
*B62D 25/02* (2006.01)

(52) U.S. Cl.
USPC .......................... 296/186.1; 296/191; 296/29

(58) Field of Classification Search
USPC ........................................ 296/186.1, 191, 29
See application file for complete search history.

(56) References Cited

U.S. PATENT DOCUMENTS

| | | | |
|---|---|---|---|
| 3,419,447 A | 12/1968 | Hewitt | 156/73.3 |
| 7,338,111 B2 | 3/2008 | Lemmons | 296/186.1 |
| 7,829,165 B2 | 11/2010 | Grandominico | 428/57 |
| 7,901,537 B2 | 3/2011 | Jones | 156/289 |
| 8,424,958 B2 * | 4/2013 | Wylezinski et al. | 296/186.1 |
| 2002/0148196 A1 | 10/2002 | Barry | 52/742.1 |
| 2005/0042433 A1 | 2/2005 | Jones | 428/292.1 |
| 2006/0019078 A1 | 1/2006 | Osten | 428/292.1 |
| 2009/0278386 A1 | 11/2009 | Ehrlich | 296/193.01 |

* cited by examiner

*Primary Examiner* — Joseph Pape

(74) *Attorney, Agent, or Firm* — Taft, Stettinius & Hollister, LLP

(57) ABSTRACT

A connector securing a liner to a scuff in a container sidewall is disclosed. The connector is adapted to receive and secure various thicknesses of liners and scuffs. The connector is made of a light weight, high strength flexible material and well suited to secure non-metallic scuffs and non-metallic linings. The connector includes a transition piece that utilizes clamping force (pre-tightening force) to connect two different thicknesses of panels made of continuous glass fiber reinforced thermoplastic material. The connector includes a thick lower opening adapted to secure the scuff and a thin upper opening adapted to secure the liner. In an exemplary embodiment of the invention, the width of the lower opening is between 5.0 mm and 5.5 mm while the width of the upper opening is between 1.5 mm and 2.0 mm.

18 Claims, 11 Drawing Sheets

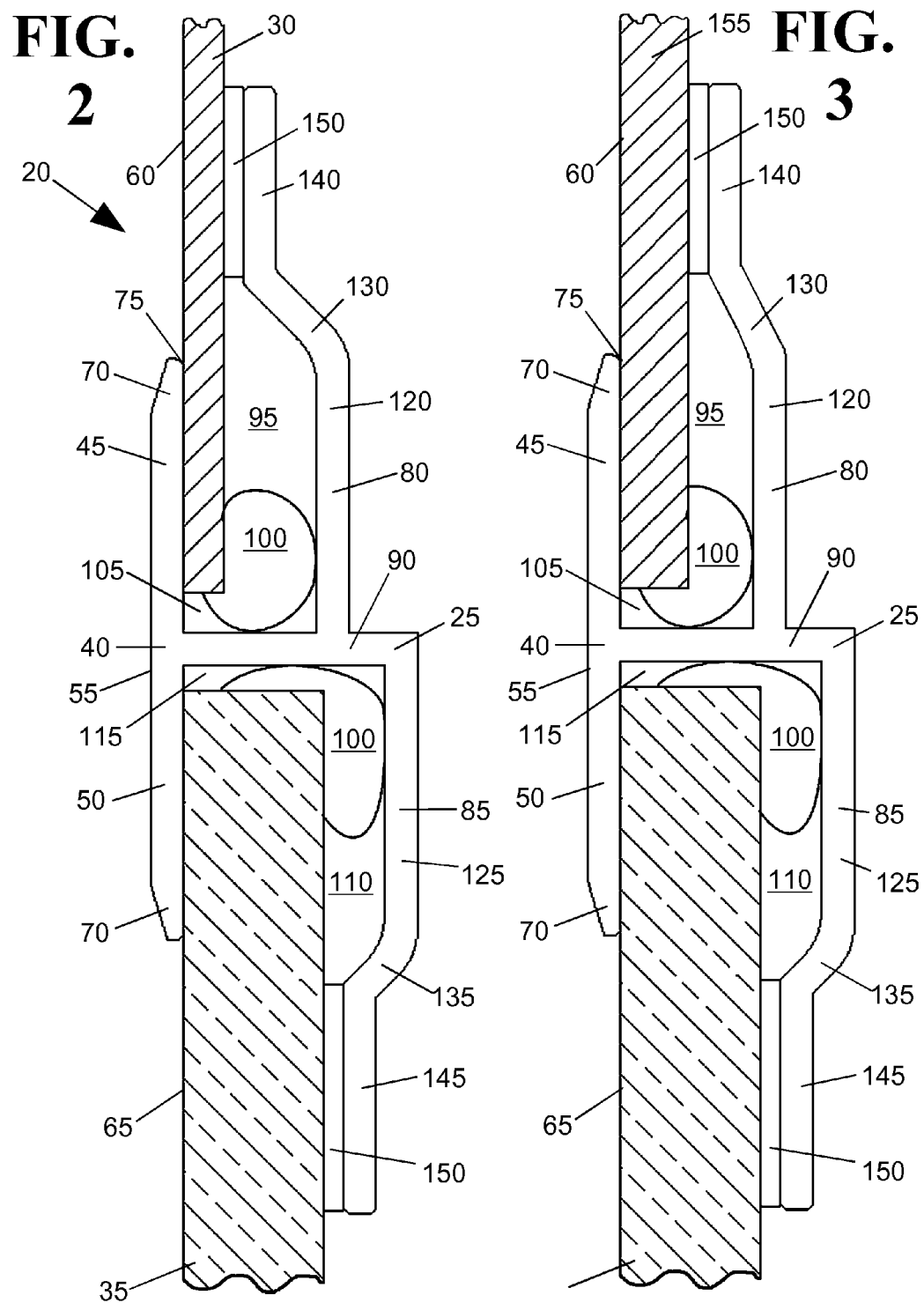

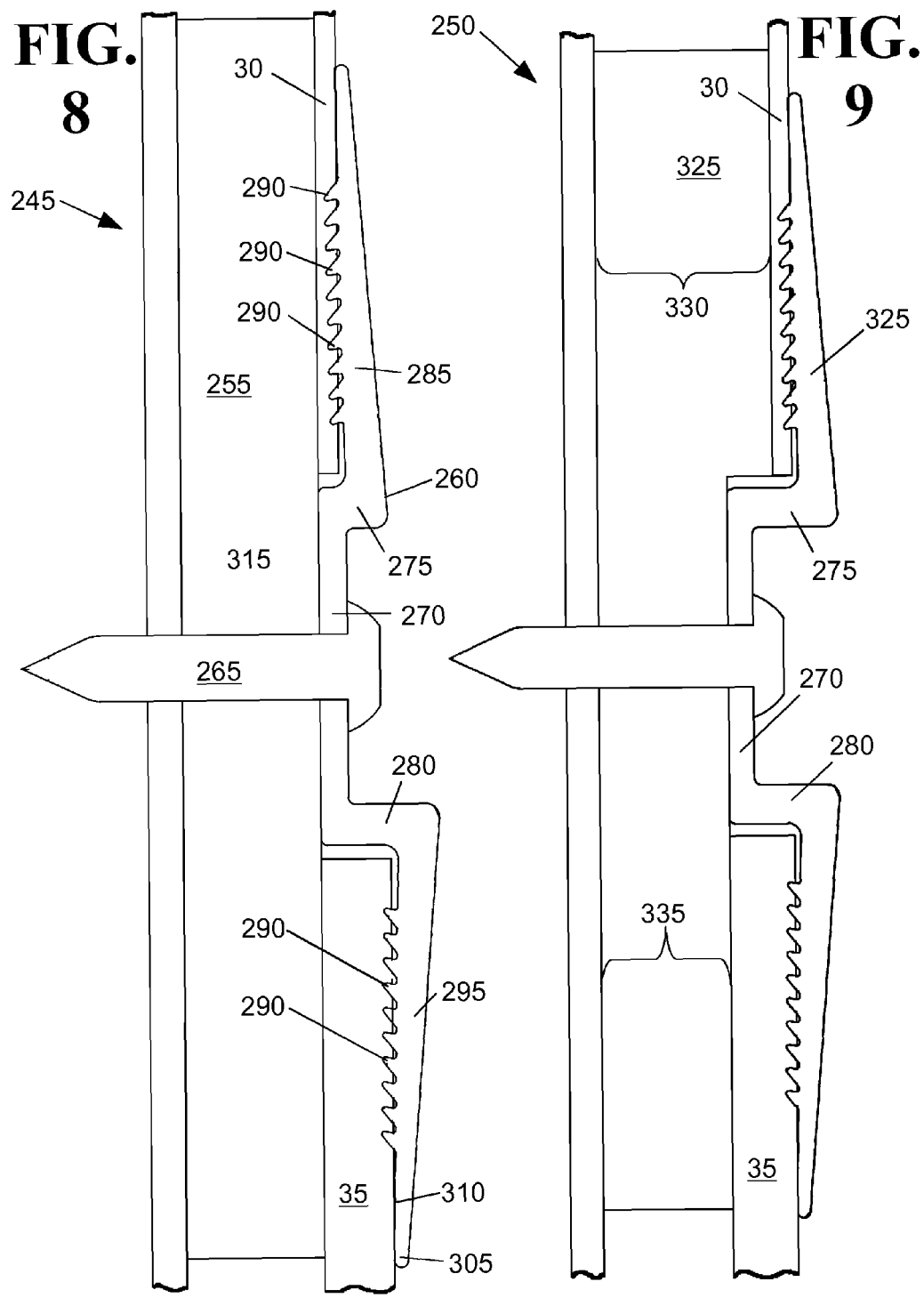

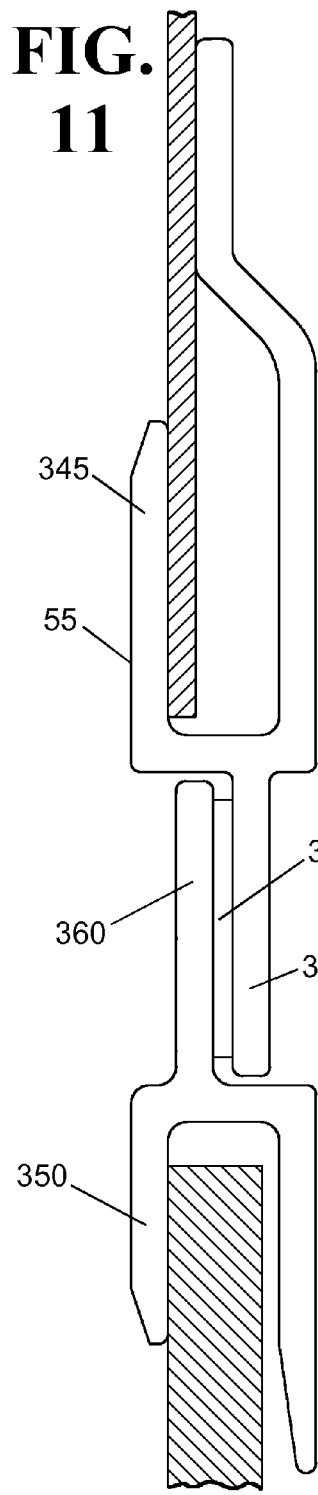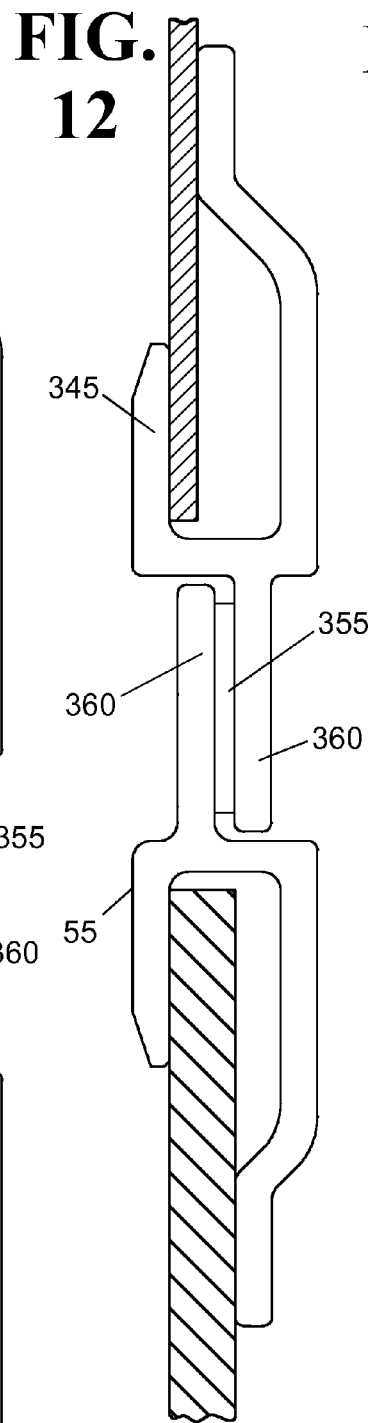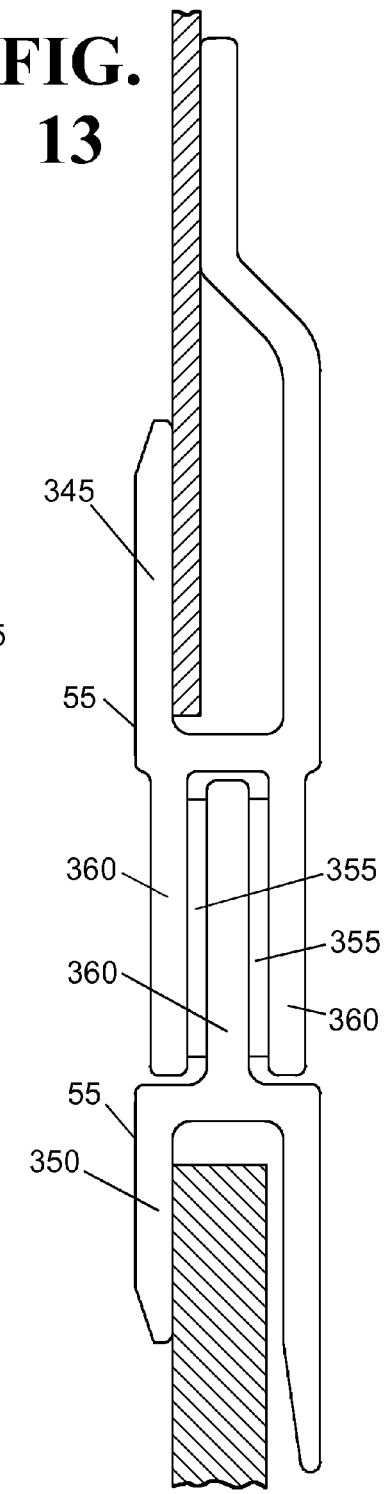

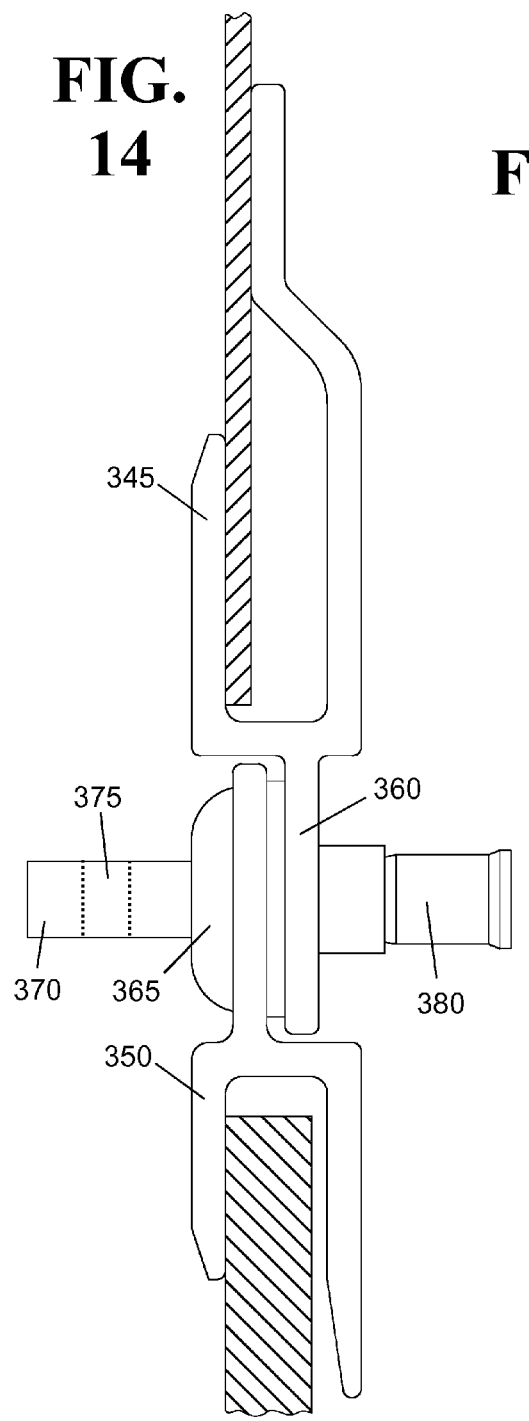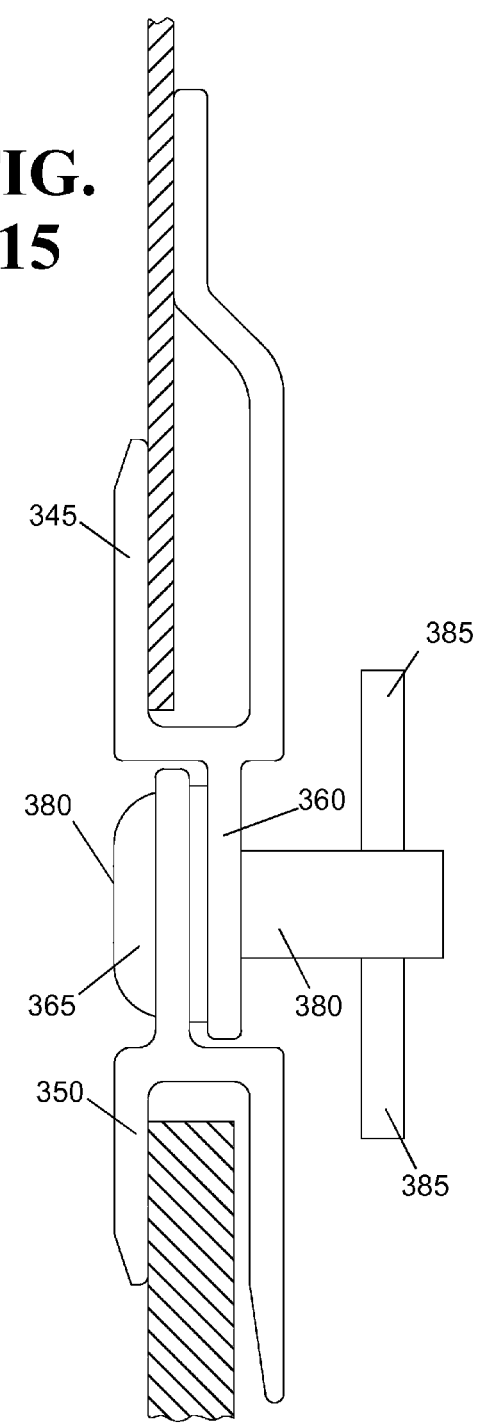

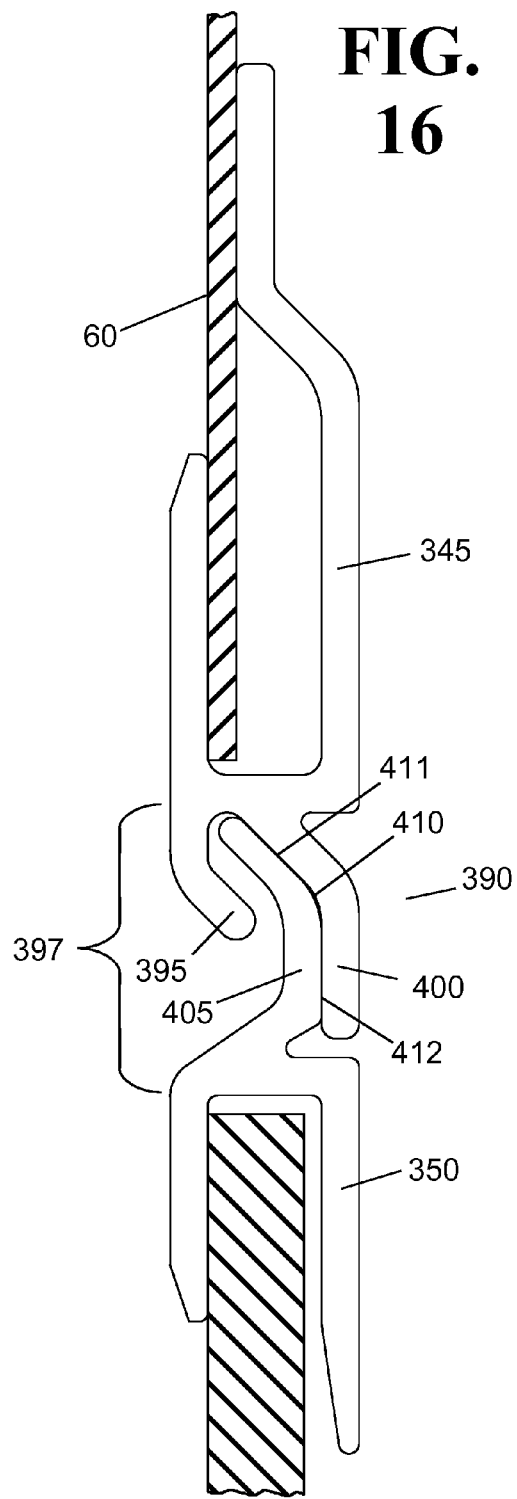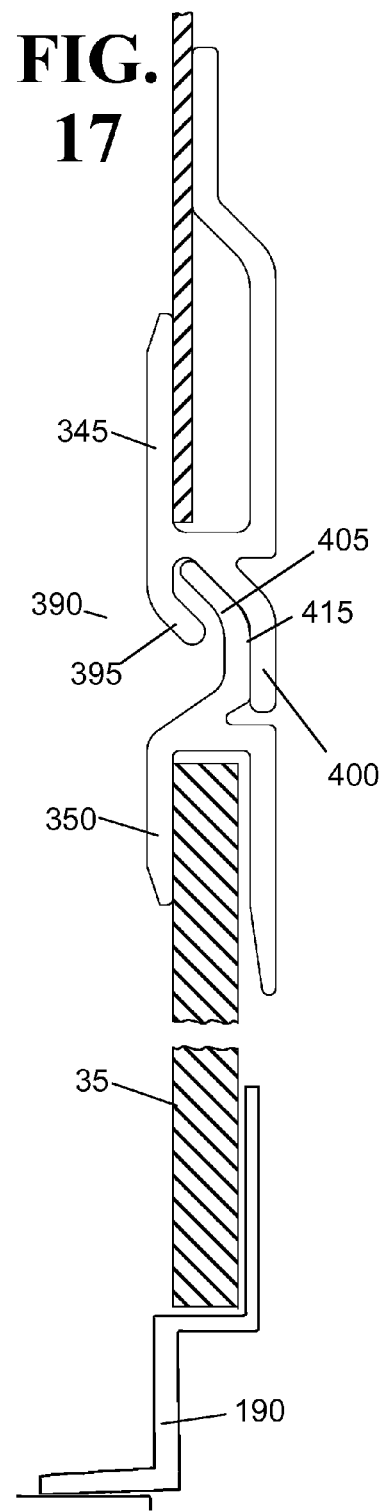

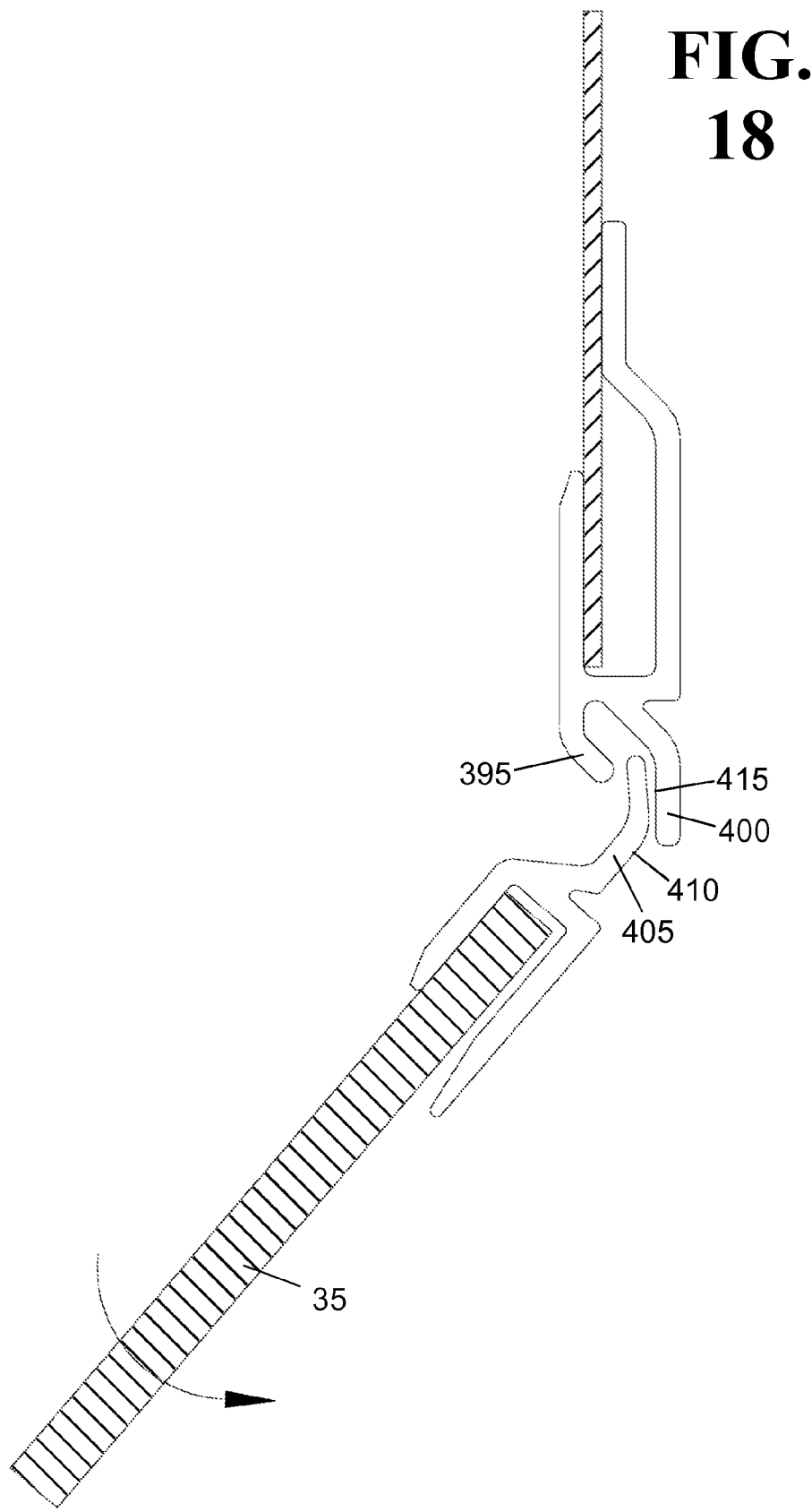

CONNECTOR BETWEEN NON-METALLIC SCUFF AND LINING

FIELD OF THE INVENTION

The present invention relates generally to the field of connectors between scuffs and liners of containers and more particularly to connectors between non-metallic scuffs and non-metallic linings of refrigerated, insulated and dry good containers and transport vehicles.

BACKGROUND OF THE INVENTION

Insulated and refrigerated containers and dry van trailers are extensively used internationally. The interior walls of these containers are often protected by a lower scuff secured to an upper liner. The lower portions of the container typically experience far more wear and abuse than the upper portions, so the scuff typically has a more resilient, thicker construction than the liner.

Increased energy costs and environmental requirements have caused thermoplastic non-metallic composite scuffs and liners to become more widely used due to their light weight, good shock resistance, wear resistance and low maintenance costs. These thermoplastic non-metallic composite scuffs and liners have become the first choice for insulated, refrigerated, and dry freight transportation vehicles. The non-metallic scuffs and liners are typically secured together by lap fusion welding using an ultrasonic welding process. FIG. 1 illustrates a prior art example of a panel 10 sonically lap welded to a sheet 15 from U.S. Pat. No. 7,829,165 issued to Grandominico.

Based on the expected wear patterns of the end user, container manufacturers vary both the thicknesses and heights of the liners and scuffs, which often requires the manufacturer to purchase a variety of non-metallic scuffs which have different dimensions integrated with the linings. While some variations of scuff and liner are typically used, there are other combinations that are rarely used. This forces manufacturers to store large quantities of scuff and liner combinations, leading to inventory management, purchasing, and daily material maintenance problems. To avoid storage costs, the manufacturer may order or produce smaller quantities of the scuff and liner combinations, but then the manufacturer loses certain economies of scale resulting in higher prices per unit.

SUMMARY OF THE INVENTION

The present invention provides a light weight, high strength flexible connector for non-metallic scuffs and non-metallic linings. The connector includes a transition piece which utilizes a clamping force (pre-tightening force) to connect two different thicknesses of panels made of continuous glass fiber reinforced thermoplastic material. The connector includes a thick lower opening adapted to secure the scuff and a thin upper opening adapted to secure the liner. In an exemplary example of the connector, the width of the lower opening is between 5.0 mm and 5.5 mm while the width of the upper opening is between 1.5 mm and 2.0 mm.

BRIEF DESCRIPTION OF THE DRAWINGS

FIG. 2 shows a connector secured to a scuff and a liner.

FIG. 3 shows the connector of FIG. 2 secured to a scuff and a thick liner.

FIG. 7 illustrates a connector having a plurality of holes that adhesive or foam may be passed through.

FIG. 8 shows a two-piece connector having a symmetric exterior piece.

FIG. 9 shows a two-piece connector having a symmetric interior piece.

FIG. 11 illustrates a two-piece connector having upper and lower portions adhesively bound to each other.

FIG. 12 illustrates a two-piece connector having upper and lower portions adhesively bound to each other, wherein the upper and lower portions both include springboard clips.

FIG. 13 illustrates a two-piece connector having upper and lower portions adhesively bound to each other, wherein the upper portion includes two attachment protrusions.

FIG. 14 illustrates a two-piece connector having upper and lower portions mechanically secured to each other with a fastener having a logistics slot.

FIG. 15 illustrates a two-piece connector having upper and lower portions mechanically secured to each other with a fastener.

FIG. 16 shows a two-piece connector having a hinged connection between the upper and lower portions.

FIG. 17 illustrates a two-piece connector having a hinged connection between the upper and lower portions and a floor junction adapted to receive a swinging scuff.

FIG. 18 shows the connector of FIG. 16 rotating the scuff into a vertical orientation.

DETAILED DESCRIPTION

Figure 1:
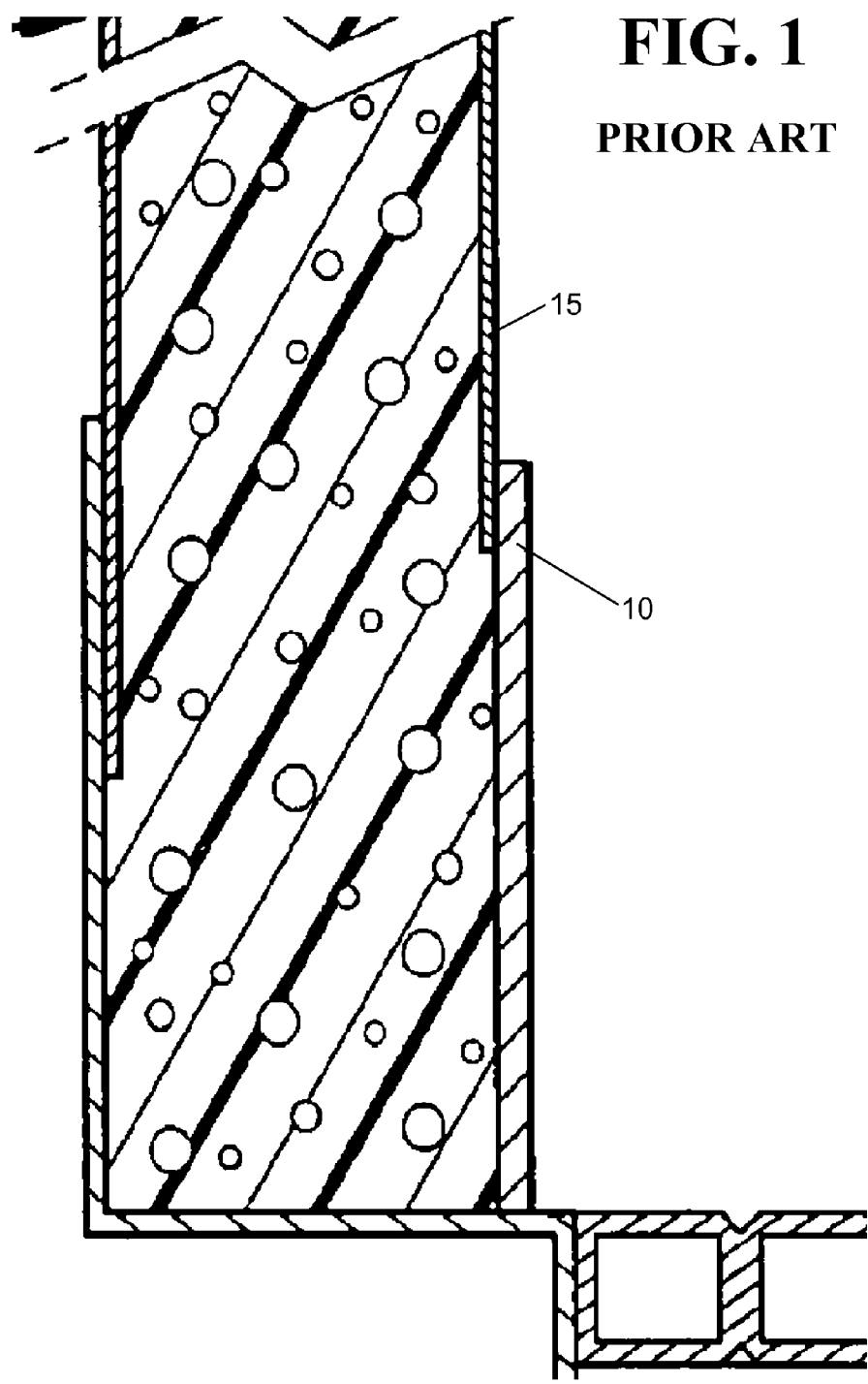
FIG. 1 shows an example of a scuff lap welded to a liner through ultrasonic welding.

The present invention may be used to secure liners and scuffs in cargo containers and is particularly suited to secure scuffs of a plurality of thicknesses to liners with a plurality of thicknesses. However, for descriptive purposes, the present invention will be described in use on over the road refrigerated trailers having non-metallic scuffs and non-metallic liners.

FIG. 2 illustrates an interior panel 20 with a connector 25 secured to a liner 30 and a scuff 35. In an exemplary embodiment, the liner 30 and scuff 35 are made of a continuous glass fiber reinforced thermoplastic material with the scuff 35 having a thickness of between 5.0 mm and 5.5 mm and height of 10, 16, or 22 inches. The liner 30 may have a thickness between 1.5 mm and 2.0 mm. The connector 25 may be constructed in an extrusion process using high strength thermoplastic glass fiber or aluminum. The connector includes an interior T section 40 on the interior side of the panel. Upper and lower interior walls (45 and 50, respectively) form a smooth inner surface 55 that is nearly flush with the interior side of the liner 60 and the interior side of the scuff 65 in order to reduce the likelihood of an object snagging on the sidewall. In the illustrated example, the interior walls of the connector 25 are tapered at their terminal ends 70 to minimize sharp edges and further reduce the likelihood of an object snagging on the connector. In an alternate embodiment, a caulk adhesive is applied to the connector 30 at the interior side of the liner 60 at the junction point 75 and smoothed to create a seamless transition from the connector to the liner 30. A similar caulk adhesive process may be used between the connector and the scuff.

An upper springboard clip 80 and a lower springboard clip 85 extend vertically from the base 90 of the connector. The upper springboard clip 80, the base 90, and the upper interior wall 45 form an upper pocket 95 in which the liner 30 is secured. Adhesive 100 in the upper pocket 95 is used to prevent the liner 30 from leaving the upper pocket 95 while holding the liner 30 against the exterior side of the upper interior wall 45. Examples of adhesives include, but are not limited to, unplasticized polyvinylchloride (PVC), polyethylene oxide, copolymers of ethylene and acrylic acid (EAA), acrylic materials, rubber base cement, an epoxy based system, and a urethane based system.

A first gap 105 may exist between the liner 30 and the base 90. The size of the first gap 105 may be adjusted to compensate for variation in the heights of multiple liners. A taller liner would have a smaller first gap. Similarly, the lower springboard clip 85, the base 90, and the lower interior wall 50 cooperate to form a lower pocket 110 that holds the scuff 35 with adhesive 100. A second gap 115 may exist between the scuff 30 and the base to compensate for variations in the height of the scuff 35.

The upper and lower springboard clips (80 and 85, respectively) each have a vertical projection (120 and 125) extending vertically away from the base 90 of the connector 25. A flex region (130 and 135) extends from the vertical projections (120 and 125) towards either the liner 30 or the scuff 35. An interface region (140 and 145) of the springboard clips (80 and 85) applies inward pressure on either the liner or scuff. In the illustrated example, an adhesive film 150 is used between the interface regions (140 and 145) and the scuff/liner in order to further secure the scuff and liner in their respective pockets. The adhesive films 150 act to provide a waterproof and moisture proof barrier between the interior of the cargo container and the exterior. The adhesive 100 used within the may also act as a moisture barrier so that the connector provides two distinct moisture barriers for both the scuff and the liner.

FIG. 3 illustrates the connector 25 and scuff 35 of FIG. 2 secured to a thick liner 155. The thick liner 155 is secured in the upper pocket 95 of the connector. The increased thickness of the liner causes the flex region 130 of the upper springboard clip 80 to deflect away from the interior side of the liner. The increased deflection causes the interface region 140 to exert a slightly greater inward force on the thick liner 155 than the liner 30 of FIG. 2. The spring constants of the upper and lower springboard clips (80 and 85, respectively) may be selected based on the expected thickness ranges of the liners or scuffs. For example, if a narrow range of material widths were to be used, a higher spring constant flex region may be utilized to exert higher inward pressures from the springboard clips. If a larger range of thicknesses were to be accommodated, a lower spring constant may be utilized so to prevent an excessive amount of force being applied to thicker scuffs and liners.

Figure 4:
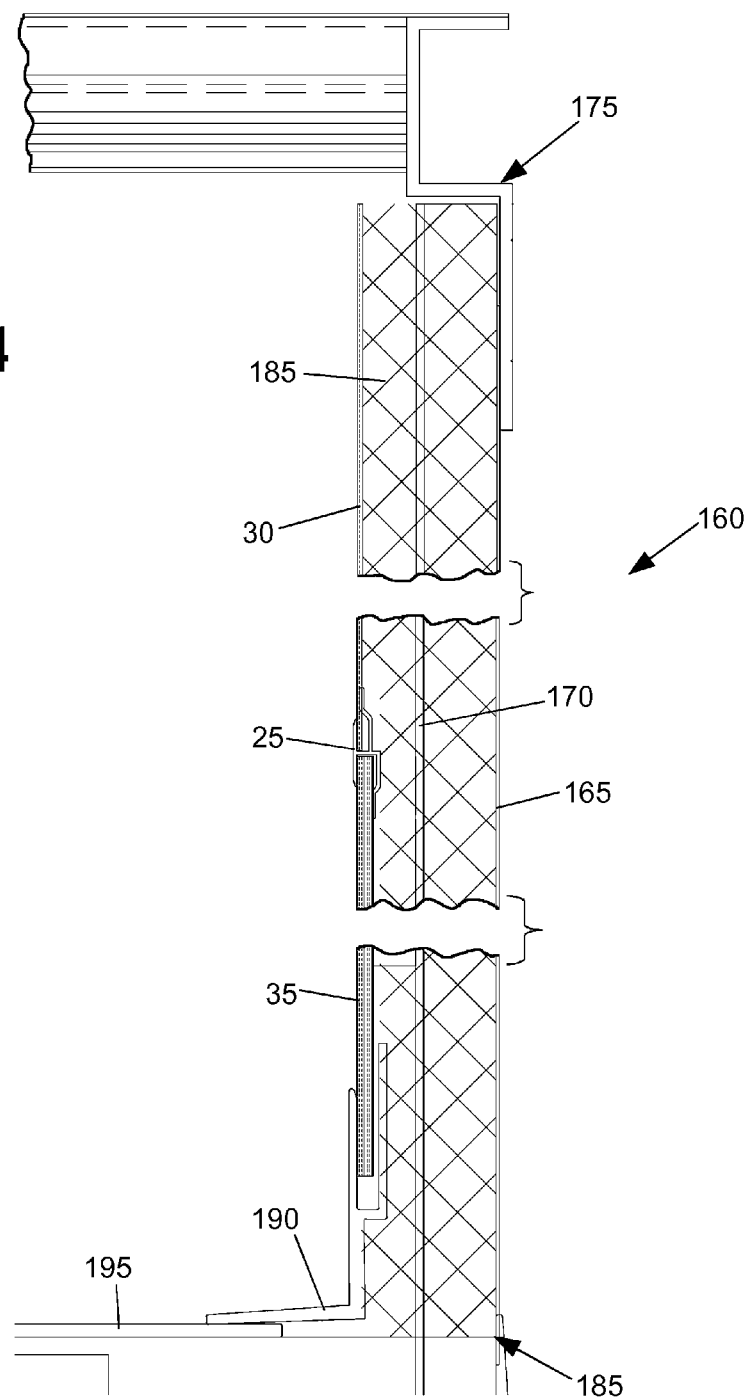
FIG. 4 shows a connector, scuff, and liner forming the interior of a container sidewall.

FIG. 4 illustrates the interior panel 20 of FIG. 2 forming the interior side of a container sidewall 160. The container sidewall also includes an exterior panel 165 that forms the exterior of the sidewall. Between the interior panel 20 and the exterior panel 165, posts 170 act to provide structural support from the top of the container 175 and the bottom of the container 180. Foaming 185 may be utilized between the interior and exterior panels to increase the insulative properties of the container, such as needed for containers designed to ship refrigerated goods. A floor junction 190 is utilized to secure the scuff 30 to the floor of the container 195. As with the connector 25, the floor junction 190 may be structured to receive a plurality of scuff thicknesses.

Figure 5:
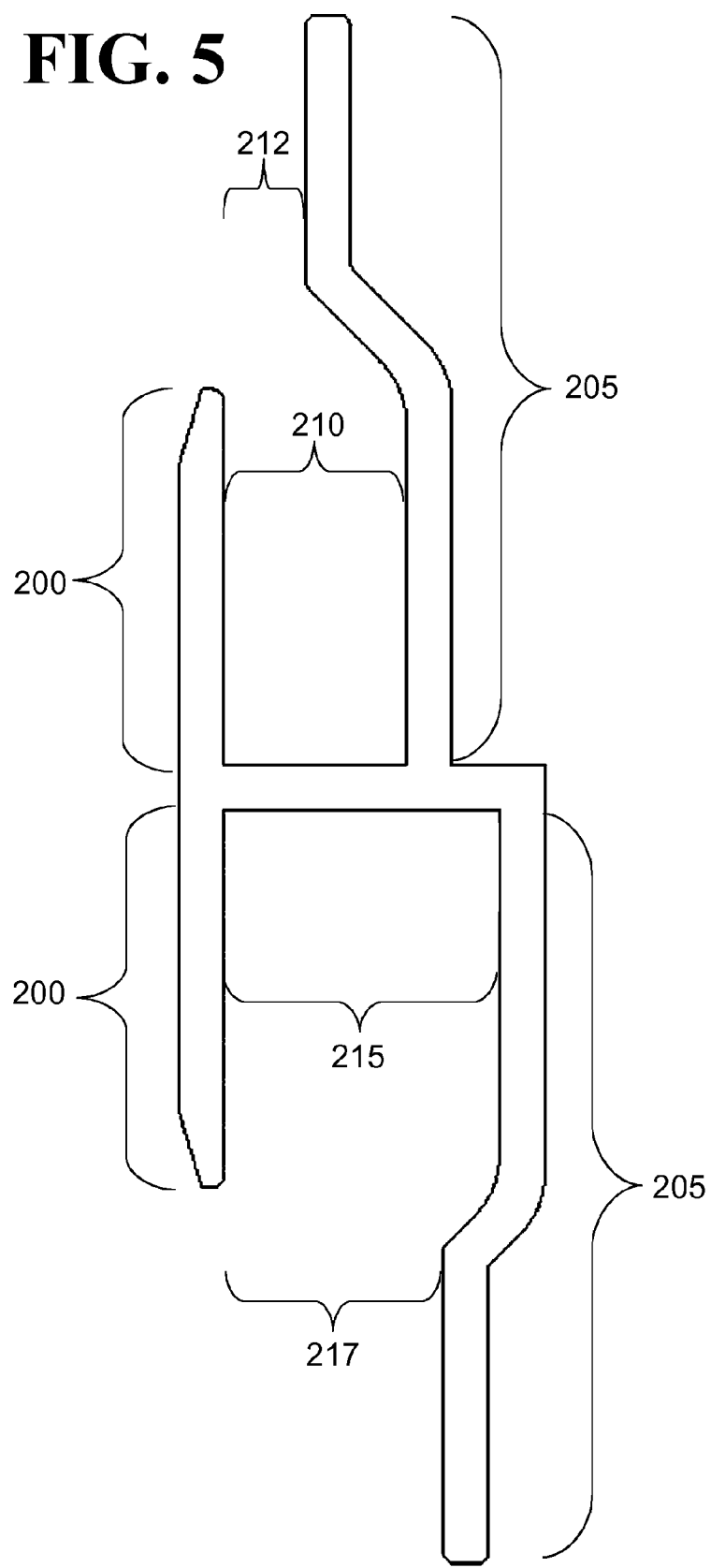
FIG. 5 shows the connector of FIG. 2 isolated from the scuff and liner.

FIG. 5 illustrates the connector 20 of FIG. 2 isolated from the liner and scuff. The upper and lower interior walls (45 and 50) each extend a first distance 200 from the base 90 of the connector while the upper and lower springboard clips (120 and 125) each extend a second distance 205 from the base 90. While the vertical heights of the interior walls (45 and 50) are the same and the heights of the two springboard clips (120 and 125) are the same in the illustrated example, connectors with non-equal heights are within the scope of the present invention. The upper pocket width 210 is substantially smaller than the lower pocket width 215 due to the relative thicknesses of the liner and scuff. The upper pocket opening 212 is also smaller than the lower pocket opening 217. In an exemplary embodiment, the upper pocket opening 212 has a width of 1 mm while the upper pocket width 210 is 3 mm which allows the connector to accept a liner having a thickness between 1.5 mm and 2.0 mm. In another exemplary embodiment, the lower pocket opening 217 has a width of 3.5 mm and the lower pocket width 215 is 6.0 mm that allows the connector to secure a scuff having a width between 4.0 mm and 5.5 mm.

Figure 6:
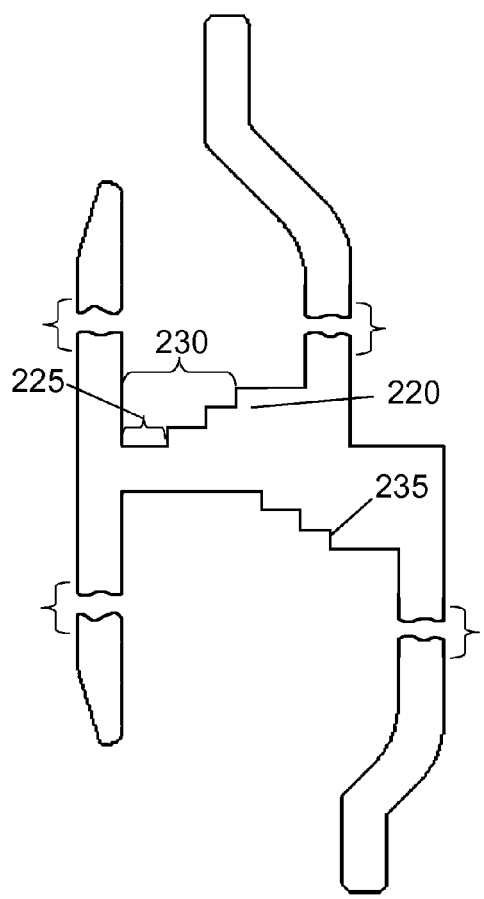
FIG. 6 shows a connector with stepped ridge regions adapted to secure liners and scuffs.

FIG. 6 illustrates an example of a connector having stepped ridge regions 220 located in the upper and lower pockets. The steps are spaced at various standard distances (225 and 230) from the upper and lower interior walls (45 and 50) that correspond with the thicknesses of commonly utilized scuffs and liners. When a scuff or liner is secured between a step 235, the exterior side of the scuff or liner is pressed against the step which inhibits rotation of the scuff or liner about the upper or lower interior walls. By mechanically securing the scuff or liner, the need for adhesive in the pocket is decreased. In the event that a scuff or liner is utilized that does not have a width that corresponds to a standard distance, the scuff or liner may simply be secured in the upper or lower pocket with adhesive as shown in FIGS. 2 and 3.

Figure 7:
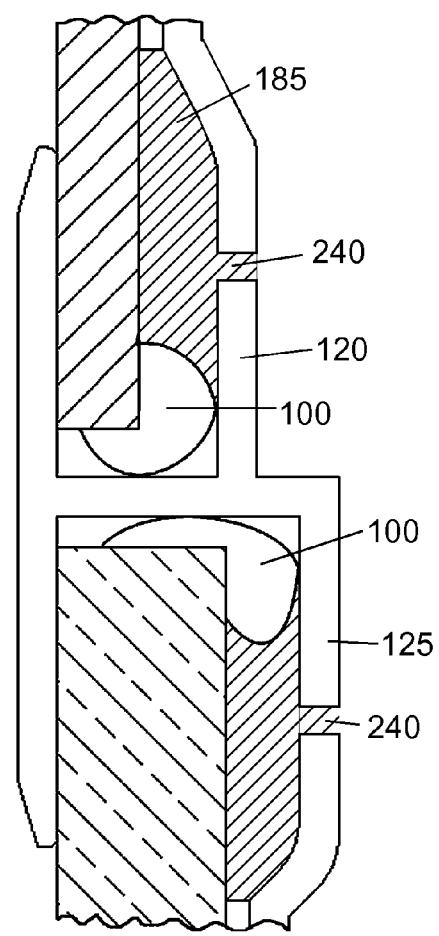

FIG. 7 illustrates an example of a connector having a plurality of holes 240 located in the upper and lower springboard clips (120 and 125) that allow foaming 185 to enter into the upper and lower pockets of the connector. The foaming may enter through the holes 185 when foaming is added between the exterior panel and interior panel of the container sidewall. Alternatively, the foaming in the connector may be added in before the container sidewall is foamed. In yet another embodiment, foam 185 is not added through the holes 240 in the upper and lower springboard clips (120 and 125), instead the adhesive 100 used to secure the scuff or liner in the pocket is sprayed through the holes 240. In the illustrated example, the holes 240 are located in an interior portion of the container sidewall so the foam or adhesive may be allowed to overflow out of the holes without detracting from the refined appearance of the container sidewall.

FIGS. 8 and 9 show a first and second adjustable connector (245 and 250, respectively) secured to a liner 30 and a scuff 35. The first adjustable connector 245 includes a symmetric exterior piece 255 translationally secured to an asymmetric interior piece 260 through a horizontal translation fastener 265. The asymmetric interior piece 265 includes a central region 270 adapted to receive the horizontal translation fastener 265. The central region 270 may be reinforced to withstand the forces exerted upon it by the horizontal translation fastener 265. Upper and lower horizontal walls (275 and 280, respectively) extend from the central region towards the interior of the storage container. In the asymmetric interior piece 260, the length of the upper horizontal wall 275 is less than that of the lower horizontal wall 280, and the length of the horizontal walls is related to the widths of the liners and scuff that are to be secured by the adjustable connector. From the interior portion of the upper horizontal wall 275, an upper flange 285 extends vertically upward. In the illustrated example, the upper flange 285 includes a plurality of ratcheting teeth 290 adapted to secure the liner 30 to the connector. While ratcheting teeth 290 are used in the illustrated example, other structures, such as mechanical fasteners or adhesives may be used to secure the liner 30 in the connector. A lower flange 295 vertically extends from the interior portion of the lower horizontal wall 280 to secure the scuff 35 in a pocket between the lower flange 295 and the symmetric exterior piece 255. As with the upper flange 285, the lower flange 295 includes a plurality of ratcheting teeth 290. The ratcheting teeth do not fully extend to the terminal ends (300 and 305) of the upper and lower flanges (285 and 295). The smooth portions 310 of the upper and lower flanges (285 and 295) near their terminal ends (300 and 305) allow the flanges to be pressed flat against the liner/scuff at their terminal ends therefore reducing the likelihood of an object snagging on the interior sidewall. As with the connector shown in FIG. 2, a caulk adhesive may be applied to the connector of FIG. 8 on the interior side of the liner at the junction point of the flange and liner to create a seamless transition from the connector to the liner.

In the illustrated example, the symmetric exterior piece 255 has a uniform width 315 throughout the entire piece, however uniform widths are only needed in the portions of the piece near the upper and lower flanges (285 and 295). By utilizing a symmetric exterior piece 255, the piece may be vertically flipped during the installation process without ill effects. Also, if the interior side of the symmetric piece is damaged, the piece may be vertically flipped so that the undamaged side is used to contact the liner and scuff.

In FIGS. 8 and 9, the horizontal translation fastener 265 is shown as a single nail or screw; however any device that can act to bring the asymmetric interior piece 265 into close proximity with the symmetric exterior piece 255 may be utilized. For example, a plurality of screws may act as the horizontal translation fastener. A cable threaded through both the asymmetric interior piece 265 and the symmetric exterior piece 255 may act as the fastener. Adhesives may also be used as the horizontal translation fastener 265. In the illustrated example the symmetric exterior piece 255 is in direct contact with the central region 270 of the asymmetric interior piece 265. Direct contact between the two pieces provides for a more rigid connector, however a connector having a gap between the interior and exterior pieces is within the scope of the present invention.

FIG. 9 illustrates a connector with an asymmetric exterior piece 320 translationally secured to a symmetric interior piece 325 through a horizontal translation fastener 265. The asymmetric exterior piece 320 has a first width 330 near the liner and a second width 335 near the scuff with the second width 335 generally being smaller than the first width 330. In an exemplary embodiment of the invention, the first width 330 plus the width of the liner 30 is equal to the second width 335 plus the width of the scuff. The symmetric exterior piece 325 includes a central region 270 adapted to receive the horizontal translation fastener 265 and upper and lower horizontal walls (275 and 280, respectively) extend from the central region 270 towards the interior of the storage container. Unlike the connector of FIG. 8, the widths of the upper and lower horizontal walls (275 and 280, respectively) are identical in the symmetric interior piece 325. Like the symmetrical exterior piece 255 of FIG. 8, the symmetrical interior piece may be vertically flipped and installed in either configuration. In both the connectors of FIGS. 8 and 9, a smoothing agent such as an epoxy may be used to fill in the area between the upper and lower horizontal walls (275 and 280) in order to reduce the number of snag points in the cargo storage container.

Figure 10:
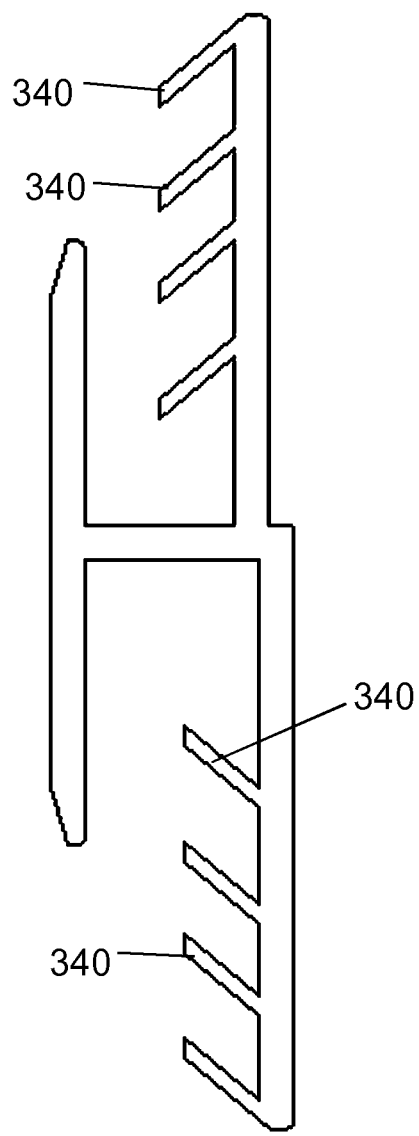
FIG. 10 shows a connector with a plurality of springboard latches.

FIG. 10 illustrates an embodiment of the connector having a plurality of springboard latches 340 that deflect inward into their respective pockets when secured to a scuff or liner. In addition to pressing the liner or scuff towards the interior wall of the connector, the springboard latches act to inhibit the removal of the scuff and liner from the pockets.

FIG. 11 illustrates an embodiment of a connector having an upper piece 345 secured to a lower piece 350 through an adhesive connection 355. A connector having separable upper and lower pieces allows for greater flexibility in accommodating various thicknesses of scuffs and liners. For example, sixteen unique connectors may be made from four unique upper pieces and four unique lower pieces. Each of the upper and lower pieces (345 and 350) includes a protrusion 360 that extends toward the other piece and is secured to the adhesive connection 355. The amount of overlap of the protrusions 360 may be varied in order to accommodate variations in the heights of both the scuff and liner. In the illustrated example, the lower piece 350 does not include a springboard clip for securing the scuff and instead uses adhesive glue (not shown). In FIG. 12, both the upper and lower pieces have springboard clips to accommodate a wide range of scuff and liner thicknesses.

FIG. 13 illustrates a connector having an upper piece 345 with two protrusions 360 extending towards the lower piece 350. The protrusions of the upper piece flank are adhesively bound to the protrusion of the lower piece 350. In the illustrated example, the adhesive connections 355 between the protrusions have substantial thicknesses; however, in an alternate embodiment, the separation between the protrusions of the upper piece is substantially equal to the thickness of the protrusion of the lower piece in order to form a tight fitting connection. In the illustrated example, the upper piece has multiple protrusions, however, in an alternate example, the lower piece has two protrusions and the upper piece has a single protrusion flanked by the protrusions of the lower piece. In yet another embodiment, both the upper piece and the lower piece have multiple protrusions that interconnect with each other. In the examples of FIGS. 11 through 13, the protrusions are slightly exterior to the smooth interior surfaces 55 of the upper and lower pieces. In an alternate embodiment, a protrusion extending from either the upper or lower pieces is flush with the smooth interior surface of the piece in order to reduce snag points on the connector.

FIGS. 14 and 15 show examples of connectors having an upper piece 345 and a lower piece 350 mechanically secured together with a fastener 365 through the protrusions 360 of the upper and lower pieces. In the illustrated examples, the fastener is a bolt, however, the fastener may be a buckle, button, clamp, clasp, cleko, clip, grommet, fabric hook and loop fastener, nail, pin, rivet, snap, staple, tack, zipper, or other type of fastener. In FIG. 14, the fastener 365 has an interior extension 370 that extends inwards into the storage container from the connector. The interior extension 370 includes a logistics slot 375 that is adapted to receive cargo tie downs that are used to secure the cargo within the cargo container. In FIG. 15, the fastener 365 includes an interior surface 380 that is flush with the smooth interior surfaces of the upper and lower pieces in order to reduce the number of snag points on the connector. A sidewall may be constructed using a plurality of different fasteners, for example, the majority of the fasteners may have smooth interior surfaces to reduce the likelihood of an object snagging on the sidewall, while one fastener every 5 feet along the length of the sidewall has a interior extension with a logistics slot. In FIGS. 14 and 15, the exterior portion 380 of the fastener 365 extends outward from the fastener into the foaming that insulates the container. In an alternate embodiment, the exterior portion of the fastener only extends to a point that is flush with the exterior sides of the upper and lower pieces. In yet another embodiment, the exterior portion 380 includes a plurality of flanges 385 that extend into the foam or connect to the posts of the sidewall and act to stabilize the connector.

FIGS. 16 through 18 illustrate examples of a connector with an upper piece 345 and a lower piece 350 connected together by a hinged connection 390 comprising a plurality of angled protrusions extending from the pieces. In the illustrated examples, an interior angled protrusion 395 and an exterior angled protrusion 400 extend down from the upper piece 345 in a base region 397. A middle angled protrusion 405 extends upward from the lower piece 350 and is secured between the angled protrusions of the upper piece. In the illustrated examples, the middle angled protrusion 405 has an exterior surface 410 with an angled portion 411 and a parallel portion 412 that compliments and is substantially defined by an interior surface 415 of the exterior angled protrusion 400. The parallel portion 412 of the exterior surface 410 oriented parallel to the interior side 60 of the liner and the angled portion 411 nonparrallel or oblique to the interior side of the liner. When the exterior surface 410 contacts the interior surface 415, the lower piece is prevented from rotating further towards the exterior of the cargo container and the scuff 35 is held in a substantially vertical orientation. FIG. 17 illustrates a scuff 35 that has been rotated to contact a floor junction 190. The scuff may be secured to the floor junction 190 with an adhesive and an adhesive may also be used between the angled protrusions to secure the upper piece 345 to the lower piece 350. Alternatively, a fastener may be used to secure the rotated scuff to the floor junction. In the event that the scuff 35 is damaged, the hinged connection allows for the damaged scuff to be rotated away from the sidewall and replaced with a new scuff. To facilitate removal of damaged scuffs, an easily removable fastener, such as a snap or hook and loop fabric, may be used to secure the scuff 35 to the floor junction 190. FIG. 18 illustrates the connector of FIG. 16 being rotated into a vertical position.

The inventors contemplate several alterations and improvements to the disclosed invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the specific examples described.

We claim:

1. A container sidewall comprising:
a liner with an interior side and an exterior side,
a scuff with an interior side and an exterior side,
a connector secured between the liner and the scuff, the connector having portions adjacent to the interior side of the liner, the exterior side of the liner, the interior side of the scuff, and the exterior side of the scuff;
the connector includes
an upper interior wall and a lower interior wall, both walls extending from a base region located between the liner and the scuff;
the upper interior wall vertically extending adjacent to the interior side of the liner; the lower interior wall vertically extending adjacent to the interior side of the scuff; and
an upper clip
contacting and extending from the base region at a first point,
contacting the exterior side of the liner at only a first region, and
having a spring region located directly between the first point and the first region.

2. The container sidewall of claim 1, wherein
the connector includes
a lower clip secured to the exterior side of the scuff;
the first point located a first distance from the upper interior wall;
the lower clip extending from the base region at a second point located a second distance from the lower interior wall;
the first distance being substantially equal to the second distance.

3. The container sidewall of claim 1, wherein
the connector includes
the first point located a first distance from the upper interior wall and contacting an interior wall of the upper clip;
the interior side of the liner is separated from the exterior side of the liner by a second distance;
the second distance being substantially less than the first distance.

4. The container sidewall of claim 3, wherein
the spring region is separated by a third distance from the liner,
the first point is located a fourth distance from the liner, and
the third distance is less than the fourth distance.

5. The container sidewall of claim 4, wherein
the upper clip, the base region, and the upper interior wall of the connector form an upper pocket; and
a portion of the liner is secured in the upper pocket by a first adhesive.

6. The container sidewall of claim 5, wherein
a second adhesive secures the upper clip to the liner at the first region.

7. The container sidewall of claim 1, wherein
the upper interior wall includes an upper tapered terminal end a first distance from the base region;
the lower interior wall includes a lower tapered terminal end a second distance from the base region; and
the first distance is equal to the second distance.

8. The container sidewall of claim 4, wherein
the lower clip, the base region, and the lower interior wall of the connector form a lower pocket; and
a portion of the scuff secured in the lower pocket.

9. The container sidewall of claim 1 wherein
the connector including a first piece directly secured to only one of the liner or the scuff, and a second piece secured to the other of the liner and the scuff;
the first piece having a first protrusion extending towards the second piece, and the second piece having a second protrusion extending towards the first piece.

10. The container sidewall of claim 9 wherein
the first protrusion has a vertical exterior side contacting and substantially defined by a vertical interior side of the second protrusion.

11. The container sidewall of claim 10 further comprising the second piece having a third protrusion extending towards the first piece, a portion of the first protrusion secured directly between the second protrusion and the third protrusion.

12. The container sidewall of claim 11 further comprising the scuff secured to a floor junction.

13. A system with a first container sidewall and a second container sidewall,
each container sidewall including:
a liner and a scuff secured together by a connector,
the connector having
a first vertical interior wall directly contacting the scuff,
a second vertical interior wall directly contacting the liner,
a base region directly secured to both the first vertical wall and the second vertical wall, the base region located between the scuff and the liner,
a first clip extending from the base region to the liner, and
a second clip extending from the base region to the scuff;
the first clip having an interior side extending from the base region at a first point located a first distance from the second vertical interior wall;
the liner having an interior side and an exterior side, the interior side of the liner separated from the exterior side of the liner by a second distance; and
the second distance being substantially less than the first distance.

14. The system of claim 13 wherein
each connector includes
a first piece directly secured to only one of the liner or the scuff, and a second piece secured to the other of the liner and the scuff;
the first piece having a first protrusion extending towards the second piece, and the second piece having a second protrusion extending towards the first piece.

15. The system of claim 13 wherein
each container sidewall has
the first vertical interior wall including an upper tapered terminal end a third distance from the base region;
the second vertical interior wall including a lower tapered terminal end a fourth distance from the base region; and
the third distance being equal to the fourth distance.

16. A container sidewall comprising:
a liner with an interior side and an exterior side,
a scuff with an interior side and an exterior side, and
a connector secured between the liner and the scuff,
the connector having portions adjacent to the interior side of the liner, the exterior side of the liner, the interior side of the scuff, and the exterior side of the scuff;
the connector including a first piece secured to the liner or the scuff, and a second piece secured to the other of the liner and the scuff;
the first piece having a first protrusion extending towards the second piece, and the second piece having a second protrusion extending towards the first piece;
the first protrusion having an exterior side contacting and substantially defined by an interior side of the second protrusion;
the second piece having a third protrusion extending towards the first piece, a portion of the first protrusion secured directly between the second protrusion and the third protrusion; and
the exterior side of the first protrusion includes
an angled portion and a parallel portion, both the angled portion and the parallel portion contacting the second protrusion, the parallel portion oriented parallel to the interior side of the liner, and the angled portion oriented nonparallel to the interior side of the liner.

17. The container sidewall of claim 16 further comprising an upper clip
contacting and extending from a base region of the connector at a first point,
contacting the exterior side of the liner at only a first region, and
having a spring region located directly between the first point and the first region; and
the base region located between the liner and the scuff.

18. The container sidewall of claim 16 further comprising:
an upper interior wall extending from a base region located between the liner and the scuff;
an upper clip with an interior side, the interior side
extending from the base region of the connector at a first point located a first distance from the upper interior wall, and
contacting the exterior side of the liner at a first region;
the interior side of the liner separated from the exterior side of the liner by a second distance, the first distance being substantially greater than the second distance.

* * * * *